(12) United States Patent
Shamroth

(10) Patent No.: US 6,453,488 B1
(45) Date of Patent: Sep. 24, 2002

(54) RECESSED DISH DRAIN

(76) Inventor: Harry Shamroth, 1185 Webber Ave., South, Hempstead, NY (US) 11550

( * ) Notice: Subject to any disclaimer, the term of this patent is extended or adjusted under 35 U.S.C. 154(b) by 0 days.

(21) Appl. No.: 09/768,711

(22) Filed: Jan. 23, 2001

(51) Int. Cl.[7] .................................................. E03C 1/00
(52) U.S. Cl. ................................................ 4/637; 4/591
(58) Field of Search ...................................... 4/637, 591

(56) References Cited

U.S. PATENT DOCUMENTS

| | | | | |
|---|---|---|---|---|
| 227,575 A | * | 5/1880 | Rauscher | 4/637 |
| 925,574 A | * | 6/1909 | Frost | 4/637 X |
| 1,426,046 A | * | 8/1922 | Cohen | 4/591 |

FOREIGN PATENT DOCUMENTS

| | | | | |
|---|---|---|---|---|
| CH | 0417485 | * | 2/1967 | 4/637 |
| JP | 4030041 | * | 2/1992 | 4/637 |

* cited by examiner

*Primary Examiner*—Charles E. Phillips

(57) ABSTRACT

A recessed dish drain is installed in a cut out in a kitchen countertop, or any other counter space within the kitchen. Typically the recessed dish drain may be located over a dishwasher, to accommodate for unused space. The kitchen sink atop a sink base is adjacent to the dish drain, which includes a shallow concave reservoir basin covered by a flat wire or molded drainable grid, upon which dishes to be dried are placed. A drain is set at the lowest point at the center of basin. A flat stainless steel or plastic cover is provided as an extra work space when dish drain is not in use.

15 Claims, 4 Drawing Sheets

RECESSED DISH DRAIN

FIELD OF THE INVENTION

The present invention relates to recessed dish drains for residential or commercial kitchen countertops.

BACKGROUND OF THE INVENTION

U.S. Pat. No. 4,998,306 of Klimke, discloses a recessed dish drain reservoir. It is next to a conventional sink basin. There are also two overflows in Klimke '306, which lead into a central drain, between the dish drain reservoir and the kitchen sink basin. They are identified in Klimke '306 as "overflows," as opposed to "drains" or conduits.

In Klimke '306, the drain is a cascading drain over a bottom edge. In addition, the sunken drain board reservoir in Klimke '306 is not covered with a cutting board surface.

Furthermore, U.S. Pat. No. 5,915,851 of Wattrick, discloses a modular sink countertop with built-in dish drains, which can be flushed with nozzles. The dish drains in Wattrick '851 are not covered, and they are not shallow concave basins.

Covered cutting board surfaces are shown in U.S. Pat. No. 4,305,166 of Rose, which discloses a reversible sink cover for a sink which includes a decorated flat surface fitted to a sink well and having a dish draining rack of the reverse side. However in Rose '166 the dish rack is not built-in.

U.S. Pat. No. 4,480,343 of Drach also discloses a combination reversible drain and cutting board which includes means of adaptation for use with a dish rack. However, it also is not built into the countertop.

U.S. Pat. No. 5,815,855 of McKeehan discloses a sink cover which includes a flat surface for covering a sink's well and a hose with conduit for draining. However, it also is not built-into the countertop.

Moreover, U.S. Pat. Nos. Des. 324,903 of Sauter, Des. 322,474 of Dawkins and Des. 258,834 of Kinsey all disclose sink countertops with built-in drainboards. However, they are not optionally covered with flat surfaces to act alternatively as cutting board work surfaces.

In addition, U.S. Pat. Nos. 4,589,150 and 5,105,485, both of Sciabarassi, 4,854,537 of Welch, Des. 288,375 of Okami and Des. 267,125 of Luoma disclose portable dish drain boards.

OBJECTS OF THE INVENTION

It is therefore an object of the present invention to provide a recessed dish drain for drying dishes upon a sink countertop.

It is also an object of the present invention to maximize surface workspace of a kitchen countertop.

It is yet another object of the present invention to provide a dish drain, which flows into the main sink drain of a kitchen sink, without having to cascade over the upper edge of a kitchen sink basin.

It is further an object of the present invention to provide a covered dish drain, which can be hidden from view when not in use.

It is yet another object of the present invention to provide a dish drain that automatically rinses.

It is yet a further object to dispense with the need for a dish drain overflow hanging over the edge of a kitchen sink countertop.

It is yet another object to improve over the disadvantages of the prior art.

SUMMARY OF THE INVENTION

In keeping with these objects and others which may become apparent, the present invention is a recessed dish drain for a residential or commercial kitchen sink countertop. It includes a water drainable grid upon which dishes to be dried are placed. Below the grid is a shallow, preferably concave drain reservoir basin, connected by preferably a flexible water conduit hose to the main sink drain.

Moreover, the concave drain reservoir basin may have an optional collar flush system, whereby water is flushed out and down the shallow concave reservoir basin, to clean it of debris and topical germs. In addition, the collar flush system may be used with conventional residential or commercial sink basins.

Furthermore, an optional flat stainless steel or plastic lid is provided as an extra work surface space when the drain is not in use.

The drain is through a bottom conduit, rather than over a cascade edge.

DETAILED DESCRIPTION OF THE INVENTION

As shown in FIGS. 1–6 herein, the present invention relates to a recessed dish drain to be installed in a cut out in a kitchen countertop. The recessed dish drain can be used in new kitchen installations or in remodelling of existing kitchens.

Figure 1:
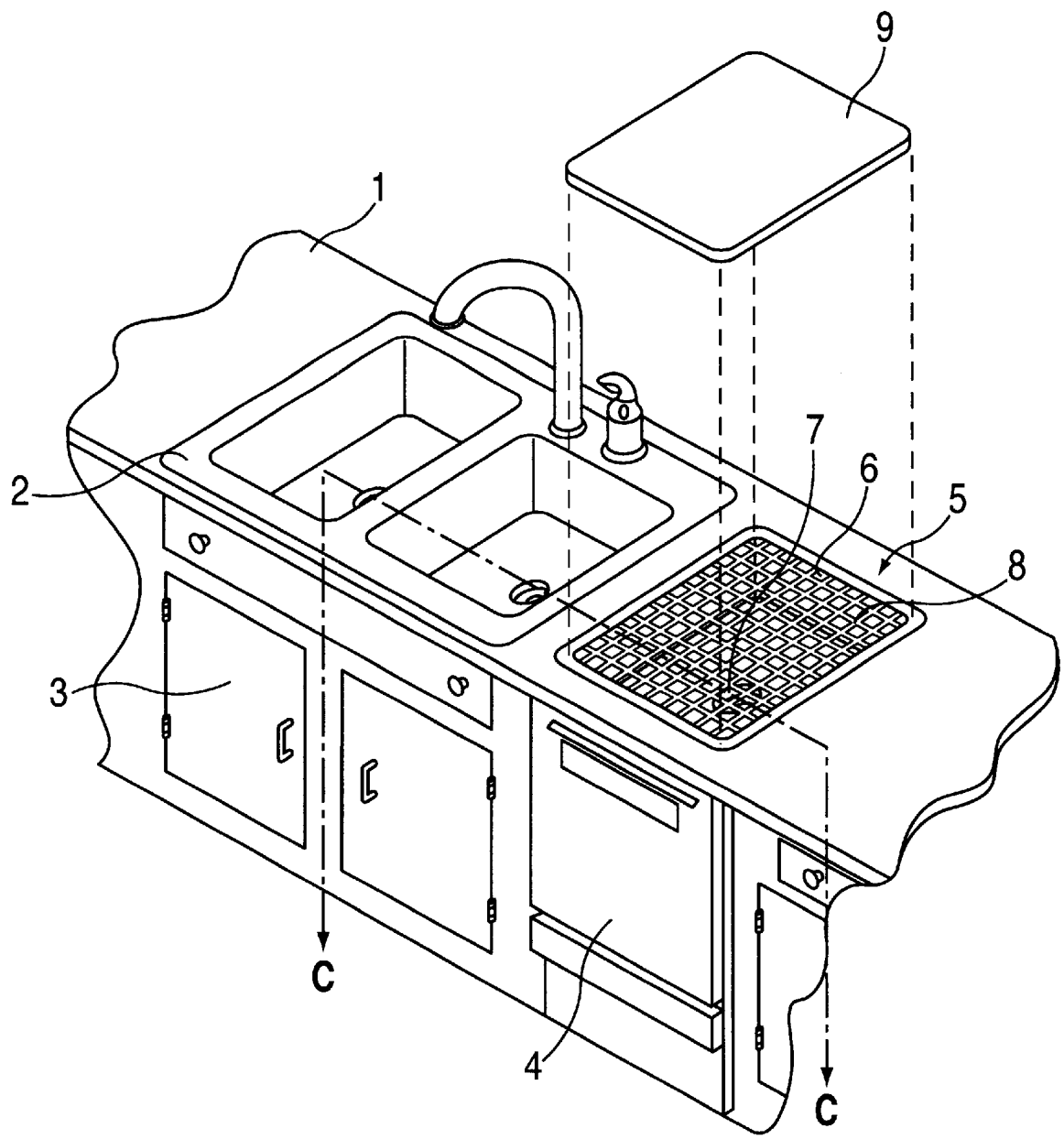
FIG. 1 is a perspective view of the dish drain of the present invention installed in preferred location over a dishwasher appliance.

FIG. 1 shows the preferred installation of dish drain 5 in a cut out of countertop 1 located over dishwasher 4. Kitchen sink 2 atop sink base 3 is adjacent to dish drain 5 which includes a shallow concave reservoir basin 6 covered by a flat wire or molded drainable grid 8 upon which dishes to be dried are placed. For example, egg crate shaped one inch by one inch boxes may be used. While shallow concave reservoir basin 6 is typically made of stainless steel, other materials such as CORIAN, solid surface veneer (SSV) or plastic may be used. A drain 7 is set at the lowest point basin 6. A flat cover 9 made of stainless steel or another material matching the material of countertop 1, such as CORIAN, FORMICA, solid surface veneer (SSV), marble, granite, plastic, etc. is provided as an extra workspace when dish drain 5 is not in use, so as not to lose working counter space.

Figure 2:
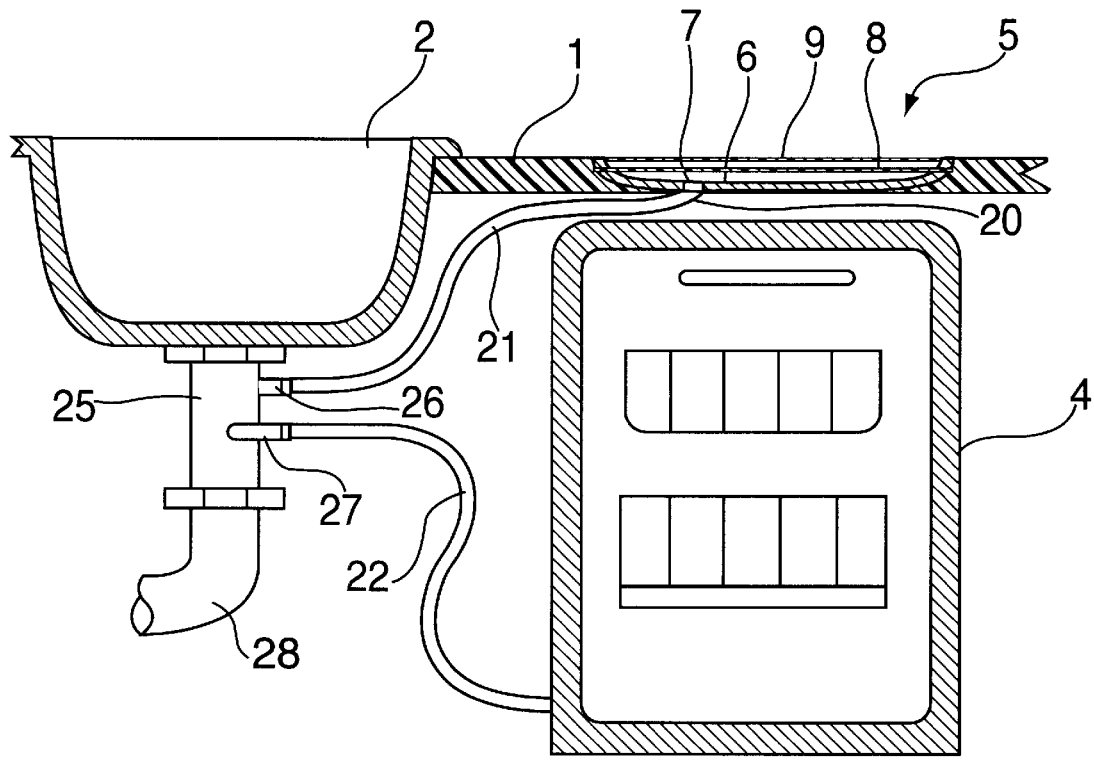
FIG. 2 is a front elevational view in crossection showing the drain hookup of the dish drain as in FIG. 1.

FIG. 2 is a front cutaway view in crossection (at plane C—C in FIG. 1) showing drain connection. A modified dishwasher drain extension 25 is rigidly attached to sink 2 bottom drain outlet.

Extension 25 differs from a normal dishwasher drain type because in addition to nipple 27 which accommodates dishwasher 4 drain hose 22, it has a second nipple 26 above to accommodate drainage hose 21 which connects to drain 7 coupler 20 at the bottom center of basin 6.

Figure 5:
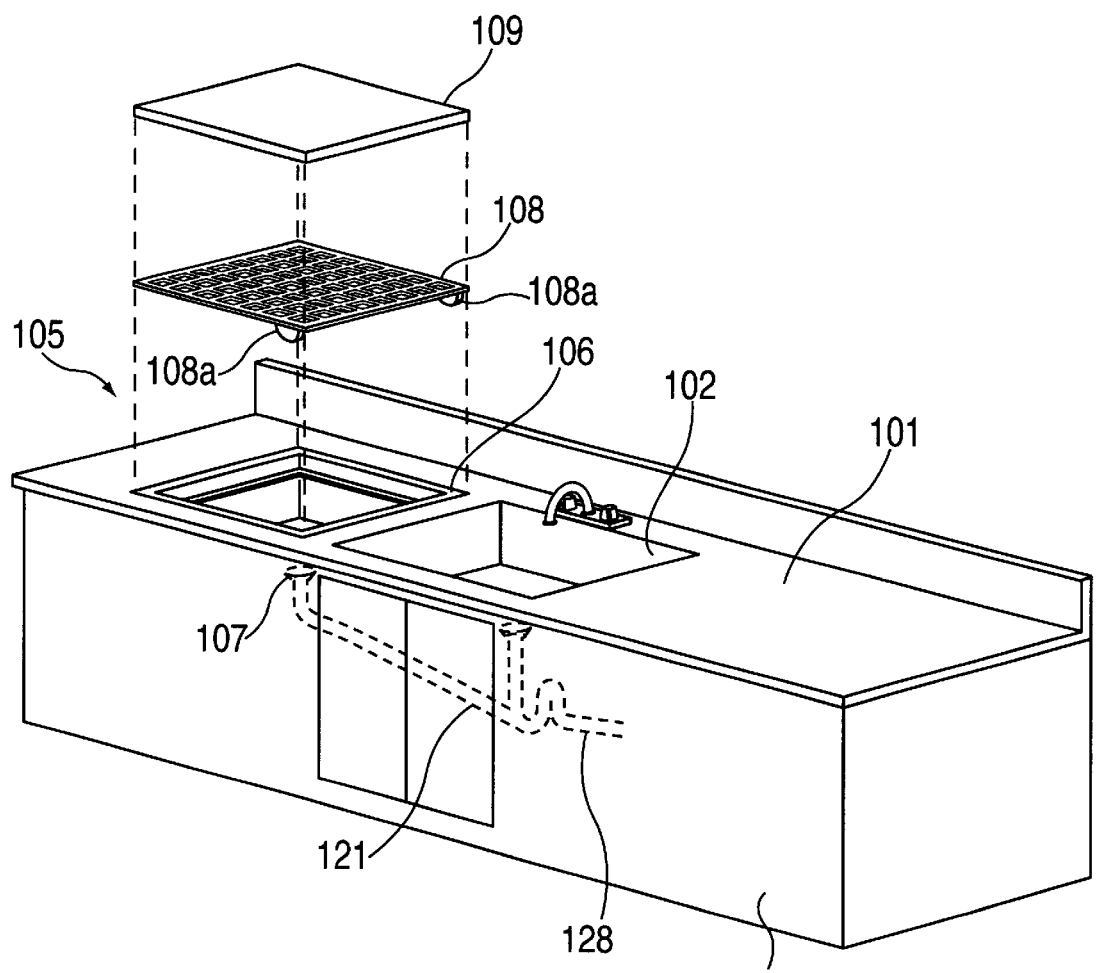
FIG. 5 is a perspective view of a dish drain installed upon a different countertop having a single basin kitchen sink; and, FIG. 6 is a side elevational view thereof shown in crossection.

Recessed drain 5 fits within the thickness of counter top 1, and coupler 20 with drain hose 21 fits in the small space between the underside of countertop 1 and the top surface of dishwasher 4. This small space typically has only about 1¼ inch clearance from the top of the dishwasher 4 and the bottom of countertop 1. For example, this small space is shown in FIG. 5 herein.

Drainage from sink 2, dishwasher 22 and recessed drain 5 all flow through elbow 28 which leads to the existing or new sanitary trap.

Addionally it is noted that the recessed dish drain 5 does not have to be located over dishwaher 4. It can be located anywhere within sink countertop 1.

Figure 3:
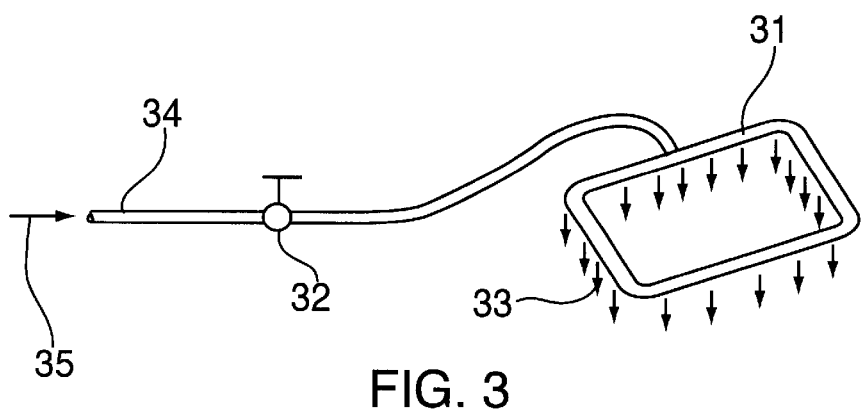
FIG. 3 is a plumbing diagram of a collar flush feature, which can be used with the dish drain of the present invention or with conventional kitchen sinks or bathroom sinks.
Figure 4:
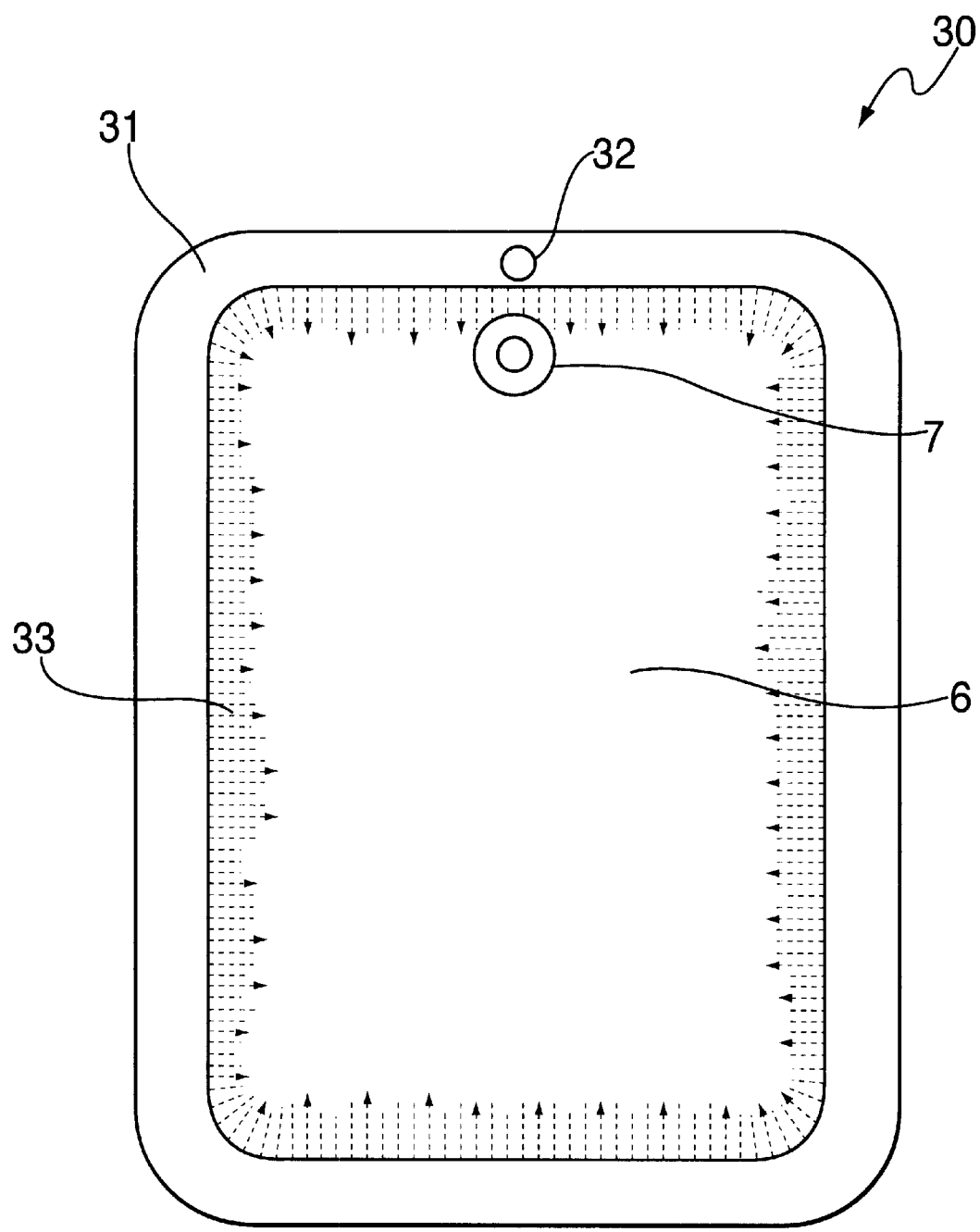
FIG. 4 is a top plan view of a recessed dish drain as in FIG. 3, provided with the flush feature.

An optional collar flush system 30 is described in the plumbing diagram of FIG. 3 and in the top view of FIG. 4. A collar flush conduit 31 with perforations along its bottom edge is fitted around the periphery of shallow basin 6.

As shown in FIG. 3, the directional arrows show vertically downward flow of water from perforations 33 exposed beneath collar flush conduit 31.

Upon pressing momentary valve 32 actuator button, a powerful flow of water 33 from the perforations in conduit 31 emanates to clean the surface of basin 6 of debris and topical germs. Valve 32 is connected to a water supply 5 by supply hose 34.

FIG. 5 shows another embodiment with dish drain 105 in a cut-out of countertop 101 having kitchen sink 102 with a single basin, shown above sink base 103. Shallow drop in basin 106, preferably made of stainless steel or another suitable waterproof and rust proof material, is covered by removable matching lid 109. As shown in FIG. 5, in crosssection, basin 106 slopes down to a lowest point at an edge of basin 106, where drain 107 intercepts water. Dishes to be dried are temporarily placed upon drainable grid 108, also molded from plastic or made of a grid of wires. Water is drained through drain 107 through drainage conduit hose 121 at a lower end of basin 106, through sink drain 128. For ease of installation, drain 107 is preferably at the lowest point of basin 106, which is shown in FIG. 5 at the lowest edge of basin 106. In other configurations, (not shown) the drain 107 can be centrally located within a dish drain basin, or otherwise within the lowest point of the dish drain basin.

It is further noted that FIG. 5 shows dish drain basin 106 is located in a countertop without a dishwasher underneath.

Figure 6:
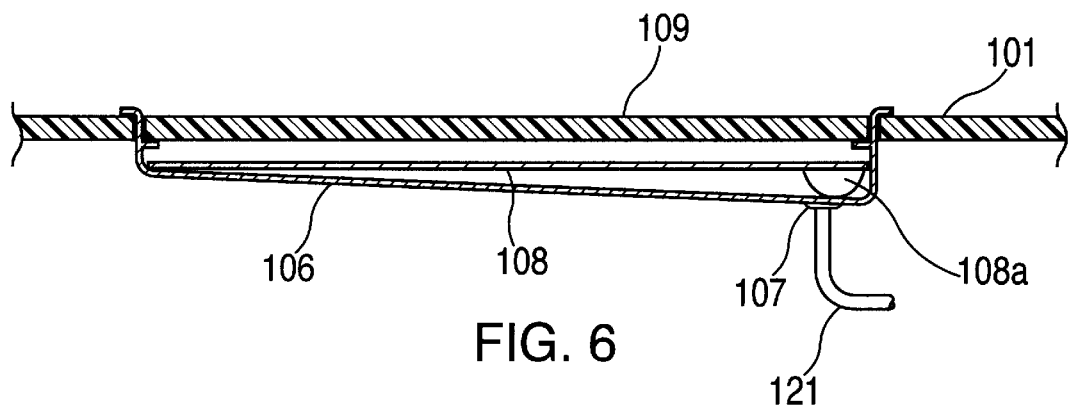

FIG. 6 is a side elevational view thereof in crosssection, showing that grid 108 may be horizontal, supported by legs 108a above downwardly slanted shallow basin 106.

It is further noted that other modifications may be made to the present invention, without departing from the scope of the invention, as noted in the appended Claims.

I claim:

1. A recessed dish drain for a new or used kitchen countertop, comprising a horizontal, removable water drainable grid upon which dishes to be dried are placed, below said grid being a slanted, recessed, shallow, concave drain reservoir basin, said slanted recessed, shallow concave reservoir basin being built into the kitchen countertop, said reservoir basin being connected at a drain at a lowest point of said reservoir basin by a water conduit extending from a lower bottom portion of said shallow concave reservoir basin to a main sink drain;

said slanted recessed shallow concave drain reservoir basin being slanted in crossection, wherein said drain reservoir at said lowest point of said reservoir basin is at one edge of said reservoir basin;

said horizontal removable water drainable grid having at least one downward extending support leg contacting a lowest portion of said slanted recessed shallow reservoir basin, said support leg raising said drainable grid to a horizontal position above said slanted recessed basin.

2. The recessed dish drain as in claim 1 wherein said dish drain is installed in a cut out in the kitchen countertop.

3. The recessed dish drain as in claim 1 wherein said drainable grid is made of the same material as the kitchen counter-top.

4. The recessed dish drain as in claim 1 wherein said dish drain is covered by a removable lid as an extra work surface space when said dish drain is not in use.

5. The recessed dish drain as in claim 4 wherein said lid is stainless steel.

6. The recessed dish drain as in claim 4 wherein said lid is of a material matching the material of the countertop.

7. The recessed dish drain dish drain as in claim 1 wherein said drainable grid is made of wires.

8. The recessed dish drain as in claim 1 wherein said drainable grid is made of molded plastic.

9. The recessed dish drain as in claim 1 wherein said conduit is a flexible hose connected to the main sink drain.

10. The recessed dish drain as in claim 9 wherein a first nipple accommodates a dishwasher drain hose, said recessed dish drain having a second nipple accommodating said conduit hose, connected to a coupler at a bottom center of said shallow concave drain reservoir basin.

11. The recessed dish drain as in claim 10 wherein drainage from the sink, the dishwasher and said recessed dish drain all flow through to a existing sanitary trap of said sink.

12. The recessed dish drain as in claim 11 further comprising a conduit coupler, said drain hose fitting in a space between an underside of countertop and a top surface of a dishwasher within said sink base.

13. The recessed dish drain as in claim 1 further comprising a collar flush system flushing out debris from said shallow concave drain reservoir, wherein said collar flush system includes an annular collar flush conduit having a plurality of vertically downwardly exposed perforations along a bottom edge thereof, said collar flush conduit being fitted around a periphery of said shallow concave basin, said vertically downwardly exposed perforations directing downward flow of water thereat.

14. The recessed dish drain as in claim 13 further comprising a depressible momentary valve actuator button, releasing a flow of water from said perforations into said conduit, cleaning said surface of said basin.

15. The recessed dish drain as in claim 14 further comprising a valve connected to a water supply by a supply hose.

* * * * *